Jan. 13, 1948.  F. A. SCHULTZ  2,434,594
MOLDING APPARATUS
Filed Oct. 6, 1944   2 Sheets-Sheet 1
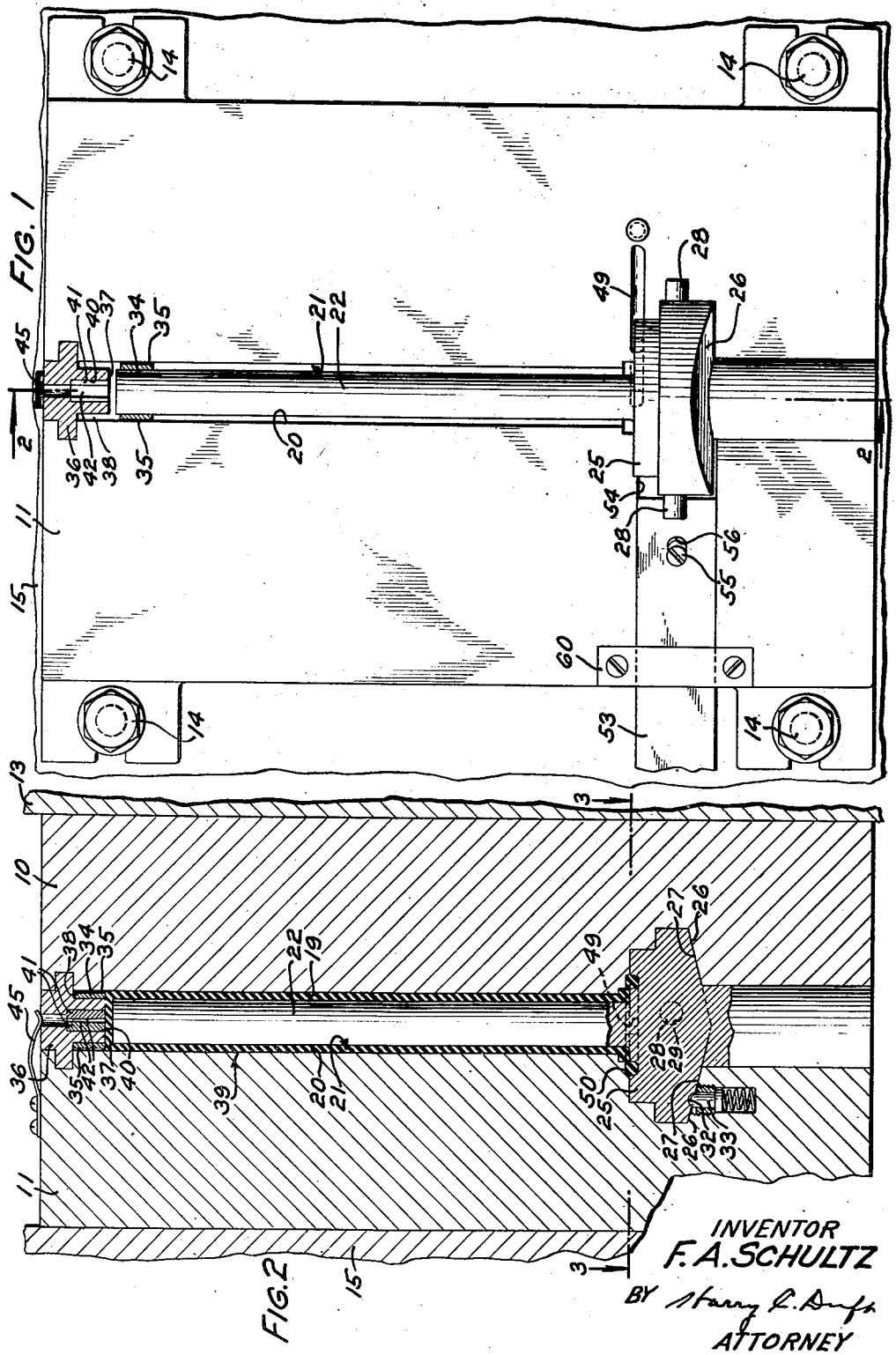
INVENTOR
F. A. SCHULTZ
BY Harry L. Duff
ATTORNEY Jan. 13, 1948.　　　F. A. SCHULTZ　　　2,434,594
MOLDING APPARATUS
Filed Oct. 6, 1944　　　2 Sheets-Sheet 2
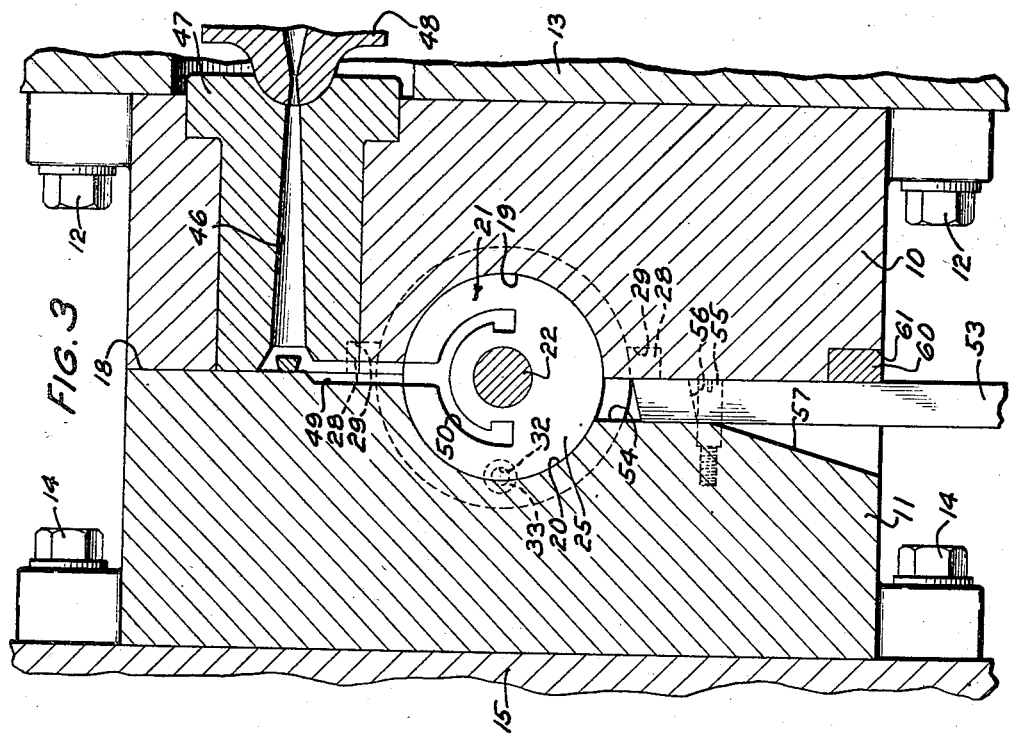
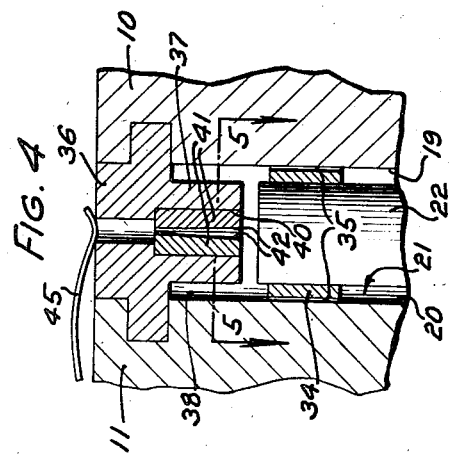
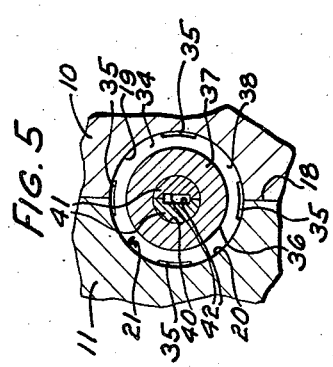
INVENTOR
F. A. SCHULTZ
BY Harry L. Duff
ATTORNEY Patented Jan. 13, 1948

2,434,594

UNITED STATES PATENT OFFICE 2,434,594

MOLDING APPARATUS

Frank A. Schultz, La Grange, Ill., assignor to Western Electric Company, Incorporated, New York, N. Y., a corporation of New York Application October 6, 1944, Serial No. 557,400

2 Claims. (Cl. 18—42)

This invention relates to molding apparatus and more particularly to an injection type molding apparatus.

The present invention is particularly useful in the molding of relatively long tubes having one closed end wherein great difficulty is experienced in holding a long core concentric in a die cavity in order to prevent its deflection during the injection operation, which deflection results in defective tubes.

An object of this invention is to provide a simple, efficient and practicable apparatus for molding hollow articles.

In accordance with the above object, the present invention, in one embodiment thereof, comprises a sectional molding die, one section of which is movable to and from a stationary section, and the two sections are formed to provide a die cavity, the parting line of the sections extending longitudinally of the die cavity. Removably attached to the movable die section is a relatively long core having an integral die portion and arranged above and spaced from the upper end of the core is a depending die member, which, in cooperation with the die cavity, core and die portion, serves to provide a mold for a relatively long tube having a closed upper end. Slidably fitted on the core and on the wall of the die cavity is a ring, which is effective to prevent deflection of the core, thus holding it concentric with the die cavity which surrounds the core as the injected molding material fills the same, the ring being finally pushed off of the core and into a recess surrounding the depending die member.

Other objects and advantages of this invention will more fully appear from the following detailed description, taken in conjunction with the accompanying drawings, in which Fig. 1 is a front elevational view, partly in section, of the movable die section of a molding apparatus embodying the features of this invention, the view being taken on the parting line of the die sections with the parts in their normal positions prior to the injection of the molding material;

Fig. 2 is a vertical sectional view taken on the line 2—2 of Fig. 1, showing the position of the parts after completion of a molding operation;

Fig. 3 is a plan sectional view taken on the line 3—3 of Fig. 2, showing the position of the parts prior to the injection of the molding material;

Fig. 4 is a fragmentary enlarged vertical sectional view of the upper portion of Fig. 2, showing the position of the parts prior to the injection of the molding material; and Fig. 5 is a plan sectional view taken on the line 5—5 of Fig. 4.

Referring now to the drawings, wherein the features of this invention have been embodied in a horizontal type molding apparatus, a stationary die section being indicated at 10 and a horizontally reciprocable die section at 11. The die section 10 is attached, as indicated at 12, to a fixed bed 13 and the die section 11 is attached, as indicated at 14, to a reciprocatory platen 15 of the apparatus, a vertical parting line of the die sections being indicated at 18 (Figs. 3 and 5). Complementary shouldered recesses 19 and 20 are formed in the die sections 10 and 11, respectively, at each side of the parting line 18, which, when the die sections are in abutting relation (Figs. 2, 3 and 4), form a die cavity, indicated in general at 21. Removably fitted in the die cavity 21 is a core member 22 having integral therewith a shouldered die portion 25, the core and die portion being generally circular in cross-section. That portion of the die portion 25 which is of the greatest diameter is formed with similarly arranged bottom sloping faces 26 (Figs. 1 and 2) which snugly engage similarly arranged and sloping faces 27 of the recesses 19 and 20 in the die sections 10 and 11, respectively.

Extending from the die portion 25 at diametrically opposite points and offset with respect to the longitudinal centerline of the core 22 and die portion 25 are lugs 28 enterable in recesses 29 in the die section 10, which, in cooperation with a recess 32 provided in one of the sloping faces 26 of the die portion and a spring pressed pin 33 mounted in the die section 11, make it possible to mount the core 22 and its die portion 25 in only one position in the recess 20 of the die section 11. The pin 33 also serves to retain the core 22 on the die section 11 until freed therefrom in a manner to be described hereinafter.

Slidably fitted upon the core 22 and on the wall of the die cavity 21 is a sleeve or ring 34, which is provided on its periphery with longitudinal slots 35 for air venting purposes. The purpose of the ring 34 will be fully described hereinafter. In the upper shouldered end of the die cavity 21 is removably fitted a shouldered die member 36 of circular cross section having a lower depending portion 37 (Figs. 1 and 4), the diameter of which is slightly less than that of the core 22, so that an annular recess 38 is formed between the die sections 10 and 11 and the portion 37 of the die member 36 directly above the upper end face of the core 22 for a purpose to be described hereinafter. The space between the upper end face of the core 22 and the lower end face of the die member portion 37 determines the thickness of the closed upper end wall of a tube 39, shown in Fig. 2, upon completion of a molding operation. Formed in the die member 36 is a shouldered aperture 40, in the lower larger diameter of which is fitted a pair of semi-cylindrical inserts 41, each having a slot 42 ground into its flat inner surface and extending longitudinally along the insert from end to end. As shown, the slots 42 taper outwardly slightly along their entire length to facilitate the removal of excess molding material entered therein. The aperture, which is rectangular in cross section, provided by the slots 42 and opening at its upper end into the smaller diameter of the aperture 40 of the die member 36, serves as an outer air venting aperture. An air venting aperture which is rectangular in cross section is desirable since it permits control of the thickness of the aperture while, at the same time, allowing control of the width.

A leaf spring 45, fixed to the die section 11 and engaging, at its outer free end, the upper surface of the die member 36, serves to maintain the die member in position in the recess 20 of the die section 11 when the latter die section is moved away from the die section 10 after a molding operation. This arrangement also lends itself to the ready removal of the die member 36 when necessary.

A horizontally disposed tapering sprue chamber 46 is formed in a hardened insert 47 secured in the die section 10 (Fig. 3) to admit molding material from a movable extrusion head 48, shown fragmentarily. A runner 49 formed jointly in the die sections 10 and 11 extends laterally on the parting line 18 of the die sections from the inner larger end of the sprue chamber 46 to the die cavity 21, where it communicates with a bifurcated runway 50 formed jointly in the upper surface of the die portion 25 of the core 22 and in the abutting surface of the die sections 10 and 11, whereby the molding material may pass into the die chamber and rise to the upper end of the core 22 under the extrusion pressure. This drives any trapped air or gas upwardly and it escapes first through the slots 35 of the ring 34 and thence through the venting aperture formed by the tapering slots 42 of the inserts 41 carried by the die member 36 and finally through the smaller diameter of the aperture 40 of the die member 36 to atmosphere.

To facilitate removal of the core 22 and its die portion 25 with the molded tube 39 thereon from the die section 11 after the separation of the die sections, a manually actuated lever 53 is provided. The lever 53 is mounted in a slot 54 formed in the die section 11 at the parting line 18 and is fulcrumed for lateral movement about a pin 55 attached to the die section and entered in an aperture in the lever, the aperture and the slot 54 being relieved, as indicated at 56 and 57, respectively, to permit the necessary lateral movement of the lever. A strap 60 secured to the die section 11 and spanning the lever 53 serves to limit the movement of the lever in one direction about the pin 55, a recess 61 being formed in the die section 10 for receiving the strap when the die sections are closed. The inner end of the lever 53, when the die sections 10 and 11 are closed (Fig. 3), abuts one of the lugs 28 provided on the die portion 25 of the core 22. Upon the die section 11 being moved to the left (Fig. 3) to separate it from the die section 10, the core 22, with its die portion 25, will be carried therewith, the spring-pressed pin 33 and the leaf spring 45 insuring that the core, as well as the die member 36, will not stay with the stationary die section 10. Thereafter, in order to free the core 22 from the die section 11, the hand lever 53 is laterally rocked clockwise about the pin 55, whereupon the inner end of the lever bearing upon the lug 28 on the die portion 25 of the core 22 loosens it from the spring-pressed pin 33, as well as from the die section, after which it may be manually removed from the apparatus. The manner of mounting the core 22 and the die member 36 in the die section 11, it is believed, will be clearly understood from the above description.

It will be evident that, in the molding of the long tube 39, having a closed end wall, difficulty will be encountered in maintaining the long core 22 concentric in the die cavity 21 even when the best steel is used to form the core unless some means is provided for preventing deflection of the core in the die cavity. This is the purpose of the sleeve or ring 34 slidably fitted upon the core 22 and the peripheral wall of the die cavity 21 and the cooperating annular recess 38 arranged between the depending portion 37 of the die member 36 and the die cavity. Although the ring 34 is shown in Figs. 1 and 4 as adjacent the upper end of the core 22 when the apparatus is in condition for a molding operation, it will be understood that it is not necessarily confined to this position, but may be positioned at any point along the core.

In the operation of the apparatus above described, the molding material, in the manner previously described, is entered in the die cavity 21 under the extrusion pressure and rises therein, pushing the ring 34 upwardly and finally pushing it off of the core and into the recess 38, as shown in Fig. 2, as the end wall of the tube 39 is formed between the cooperating surfaces of the core, die member 36 and the ring 34. This arrangement of supporting the core 22 during the molding of the tube 39 accurately maintains the core concentrically in the die cavity 21 and thus results in a straight tube with a uniform wall thickness. Upon completion of the molding operation, the die section 11 is moved away from the die section 10 and the core 22 freed from the die section 11 in the manner hereinbefore described, the molded tube 39 being removed therefrom. To remove the ring 34 from the die member 36, the latter is freed from the die section 11 and the ring slipped off the die member and then is slipped onto the upper end of the core 22. Thereafter the core 22 and the die member 36 are placed in position in the recess 20 of the die section 11, as shown in Fig. 1, and after closing the die sections, another tube may be molded.

What is claimed is:

1. In a sectional molding die for molding hollow articles, cooperating stationary and movable die sections having formed jointly therein a die cavity, a core mounted in and spaced from the wall of said cavity at one end, said core having an enlarged die and base portion at its other end normally supported in enlarged portions of said cavity, said core base portion and said stationary die section having cooperating portions so constructed and arranged that said core may be mounted only in one operative position, means mounted in said movable die section and cooperating with a face on said core base portion for retaining said core thereon upon separation of said die sections, a lever pivoted on said movable die section bearing at its inner end on one of said cooperating portions on said core base portion for freeing the core from said movable die section upon separation of said die sections, and an apertured member surrounding and slidable upon said spaced core end and externally upon the wall of said cavity for maintaining said core end in predetermined position in said cavity during the molding of an article.

2. In a sectional molding die for molding hollow articles, cooperating stationary and movable die sections having formed jointly therein a die cavity, a core mounted in and spaced from the wall of said cavity at one end, said core having an enlarged die and base portion at its opposite end normally supported in enlarged portions of said cavity, said core base portion and said stationary die section having cooperating extensions and recesses, respectively, so arranged that said core may be mounted only in one operative position, a lever pivoted on said movable die section bearing at its inner end on one of said extensions for freeing the core from said movable die section upon separation of said die sections, an apertured member surrounding and slidable upon said spaced core end and externally upon the wall of said cavity for maintaining said core end in predetermined position in said cavity during the molding of an article, and a die member mounted upon and between said die sections and having a portion adjacent an end face of said spaced core end, said portion of said die member being spaced from said die sections to provide a recess for receiving said member as it moves off said core at the completion of the molding of an article by the pressure of the molding material thereagainst entered in said cavity.

FRANK A. SCHULTZ.

REFERENCES CITED

The following references are of record in the file of this patent:

UNITED STATES PATENTS

| Number | Name | Date |
| --- | --- | --- |
| 2,351,454 | Pereles | June 13, 1944 |
| 1,816,011 | Gurnee | July 28, 1931 |
| 2,027,165 | Grubman | Jan. 7, 1936 |
| 2,370,294 | Dodge | Feb. 27, 1945 |

FOREIGN PATENTS

| Number | Country | Date |
| --- | --- | --- |
| 388,662 | Great Britain | Mar. 2, 1933 |

OTHER REFERENCES

Ser. No. 391,198, Chapuis (A. P. C.), pub. June 15, 1943.